(12) United States Patent
Honda

(10) Patent No.: US 6,839,189 B2
(45) Date of Patent: Jan. 4, 2005

(54) OBJECTIVE LENS, OPTICAL PICKUP DEVICE, RECORDER AND REPRODUCER

(75) Inventor: Koji Honda, Hachioji (JP)

(73) Assignee: Konica Minolta Opto, Inc., Tokyo (JP)

( * ) Notice: Subject to any disclaimer, the term of this patent is extended or adjusted under 35 U.S.C. 154(b) by 16 days.

(21) Appl. No.: 10/457,352

(22) Filed: Jun. 10, 2003

(65) Prior Publication Data

US 2003/0234987 A1 Dec. 25, 2003

(30) Foreign Application Priority Data

Jun. 13, 2002 (JP) .................................... 2002-172288

(51) Int. Cl.[7] ...................... G02B 3/02; G02B 13/18; G11B 7/00; G11B 7/135
(52) U.S. Cl. .................. 359/719; 359/742; 369/112.08
(58) Field of Search .................. 359/719, 724, 359/738, 739, 741, 742, 558; 469/112.01, 112.08, 112.13, 112.12, 112.2, 112.23, 44.23

(56) References Cited

U.S. PATENT DOCUMENTS

2003/0053223 A1 * 3/2003 Takeuchi et al. ............ 359/742

* cited by examiner

Primary Examiner—Georgia Epps
Assistant Examiner—Alicia M. Harrington
(74) Attorney, Agent, or Firm—Finnegan, Henderson, Farabow, Garrett & Dunner, L.L.P.

(57) ABSTRACT

An objective lens is provided in an optical pickup device for carrying out the reproduction/record for a plurality of optical information storing media in which the protect substrates of the mediums have a different thickness. The optical functional surface of the optical lens is divided into the central region including the optical axis and the peripheral region arranged outside the central region. The diffractive structure is provided on the peripheral region. When the reproduction and/or the record is carried out for the first optical information storing medium, the diffracted light is condensed on the focal point. When the reproduction and/or the record is carried out for the second optical information storing medium, among flare lights in which diffracted lights having various diffraction orders and passing through the peripheral region are mixed, the light amount of the k-th order diffracted light can be suppressed more than the (k−1)-th order diffracted light.

23 Claims, 4 Drawing Sheets

$\lambda_1$=655nm
$t_1$=0.6mm $\lambda_2$=785nm
$t_2$=1.2mm $\lambda_1 = 655\text{nm}$
$t_1 = 0.6\text{mm}$ $\lambda_2 = 785\text{nm}$
$t_2 = 1.2\text{mm}$

OBJECTIVE LENS, OPTICAL PICKUP DEVICE, RECORDER AND REPRODUCER

BACKGROUND OF THE INVENTION

1. Field of the Invention

The present invention relates to an objective lens for being used in an optical pickup device which can carry out the record and/or the reproduction of information for a plurality of optical information storing media in which the protect substrates have different thicknesses from each other; an optical pickup device; a recorder and a reproducer.

2. Description of Related Art

As a short wavelength red laser is practically used, a DVD (Digital Versatile Disk) which is a high density optical information storing medium (also referred to as "optical disk") having the same size as a CD (Compact Disk) and a high capacity is commercialized.

In a recording/reproducing apparatus for CD, a numerical aperture NA on an optical disk side of the objective lens is about 0.45 when a semiconductor laser emitting a light having a wavelength of about 780 nm is used. On the other hand, in a recording/reproducing apparatus for DVD, a numerical aperture on an optical disk side of the objective lens is about 0.6 when a semiconductor laser emitting a light having a wavelength of about 650 nm is used.

The DVD has a track pitch of 0.74 $\mu$m and a shortest pit length of 0.4 $\mu$m. The DVD has a 4 or more times higher density than the CD having a track pitch of 1.6 $\mu$m and a shortest pit length of 0.83 $\mu$m. In the DVD, in order to suppress a comma aberration caused by inclining the optical disk to an optical axis, the thickness of the protect substrate is 0.6 mm and is a half of the thickness of the protect substrate of the CD (1.2 mm).

In addition to the CD and the DVD, optical disks having various standards in which the wavelengths of lights emitted from the light sources, the thicknesses of the protect substrates and the like are different from each other, for example, CD-R, CD-RW (write once type of compact disk), VD (video disk), MD (mini disk), MO (magneto optical disk) and the like, are commercialized and popularized. Further, the semiconductor laser emitting a light having a shorter wavelength has been developed. A short wavelength blue light laser having an oscillation wavelength of about 400 nm will be practically used. Because the wavelength becomes short, it is possible that the optical information storing medium has a higher capacity even though an objective lens having the same numerical aperture as the objective lens for DVD is used.

As described above, a plurality of optical information storing media having various recoding densities, thicknesses of the protect substrates for the recording layer and wavelengths of the lights emitted from lasers for record/ reproduction have been developed. An optical pickup device which can carry out the record and/or the reproduction for two or more optical information storing media among these optical information storing media, has been demanded. Therefore, each type of optical pickup device which comprises a plurality of light sources corresponding to each using wavelength and condenses each laser light on a recording layer by using a single objective lens at a required numerical aperture, are proposed.

For example, in an optical pickup device which can carry out the reproduction and/or the record for a DVD and a CD, when the reproduction/record is carried out for a CD, a light ray passing through a region that a numerical aperture is larger than about 0.45 among an optical functional surface of an objective lens, is not used. Therefore, the optical pickup device having the objective lens that when a laser light having a wavelength for the reproduction/record for a CD passes through the above-described region, the light becomes a flare light and that in case of a laser light having a wavelength for the reproduction/record for a DVD, the aberration is hardly caused by using the laser light passing through the whole region of the optical functional surface of the objective lens, has been proposed.

In the above optical pickup device, for example, as shown in FIG. 1, the defocus/tracking is controlled by a main/sub sensor of a light receiving section. When the flare light enters a sensor, there is some possibility that a wrong operation relating to the reproduction/record for the optical information storing media is caused.

SUMMARY OF THE INVENTION

In order to solve the above-described problems, an object of the present invention is to firmly carry out the reproduction/record for each of a plurality of optical information storing media in which the protect substrates have different thicknesses from each other.

That is, in accordance with the first aspect of the present invention, an objective lens for being provided in an optical pickup device for carrying out a reproduction and/or a record of information for a first optical information storing medium having a protect substrate having a thickness of t1 by using a first light source emitting a light having a wavelength of $\lambda 1$, and for carrying out a reproduction and/or a record of information for a second optical information storing medium having a protect substrate having a thickness of t2 which is more than t1, by using a second light source emitting a light having a wavelength of $\lambda 2$ which is more than $\lambda 1$; comprises:

an optical functional surface;

wherein the optical functional surface is divided into at least two concentric optical functional regions which are arranged around an optical axis;

a light flux passing through a central region which is one optical functional region including the optical axis, is used for the reproduction and/or the record of the information for both the first optical information storing medium and the second optical information storing medium;

a light flux passing through a peripheral region which is another optical functional region arranged outside the central region, is mainly used for the reproduction and/or the record of the information for the first optical information storing medium;

a diffractive structure is provided on the peripheral region;

in case that the reproduction and/or the record of the information is carried out for the first optical information storing medium by using the first light source emitting the light having the wavelength of $\lambda 1$, a diffraction order of a diffracted light having a maximum diffraction efficiency among a plurality of diffracted lights caused by the diffractive structure is k which is an integer; and in case that the reproduction and/or the record of the information is carried out for the second optical information storing medium by using the light source emitting the second light having the wavelength of $\lambda 2$, a relation between a diffraction efficiency E2(k) of a k-th order diffracted light caused by the diffractive structure and a diffraction efficiency $E2(k-1)$ of a $(k-1)$th order diffracted light meets a following inequality:

$$E2(k-1) > E2(k).$$

According to the first aspect of the present invention, when the reproduction and/or the record of the information is carried out for the first optical information storing medium by using the first light source having the wavelength of $\lambda 1$, a diffraction order of a diffracted light having a maximum diffraction efficiency among a plurality of diffracted lights caused by the diffractive structure is k (natural number). Further, when the reproduction and/or the record of the information is carried out for the second optical information storing medium by using the second light source having the wavelength of $\lambda 2$, a relation between a diffraction efficiency $E2(k)$ of a k-th order diffracted light caused by the diffractive structure and a diffraction efficiency $E2(k-1)$ of a $(k-1)$th order diffracted light meets a following inequality:

$$E2(k-1) > E2(k).$$

Therefore, when the reproduction/record is carried out for the first optical information storing medium, the k-th order diffracted light having a maximum diffraction efficiency is condensed on the focal point. When the reproduction/record is carried out for the second optical information storing medium, a light amount of the k-th order diffracted light can be suppressed more than that of the $(k-1)$th order diffracted light among the flare lights in which diffracted lights having various diffraction orders and passing through the peripheral region are mixed.

In the optical pickup device, because the defocus/tracking is controlled by a main/sub sensor of a light receiving section, when the flare light enters the sensor, there is some possibility that a wrong operation relating to the reproduction/record for the optical information storing media is caused. By sharing a light amount of flare lights in which diffracted lights having various diffraction orders are mixed, with each diffraction order of diffracted light, the wrong operation is hardly caused by the flare lights during the reproduction/record for the second optical information storing medium.

In the specification, the diffraction efficiency denotes a ratio of a light amount of the diffracted lights caused by the diffractive structure. The sum of the diffraction efficiencies of all of the diffracted lights is 1.

In accordance with the second aspect of the present invention, an objective lens for being provided in an optical pickup device for carrying out a reproduction and/or a record of information for a first optical information storing medium having a protect substrate having a thickness of t1 by using a first light source emitting a light having a wavelength of $\lambda 1$, and for carrying out a reproduction and/or a record of information for a second optical information storing medium having a protect substrate having a thickness of t2 which is more than t1, by using a second light source emitting a light having a wavelength of $\lambda 2$ which is more than $\lambda 1$; the objective lens comprising:

an optical functional surface;

wherein the optical functional surface is divided into at least two concentric optical functional regions which are arranged around an optical axis;

a light flux passing through a central region which is one optical functional region including the optical axis, is used for the reproduction and/or the record of the information for both the first optical information storing medium and the second optical information storing medium;

a light flux passing through a peripheral region which is another optical functional region arranged outside the central region, is mainly used for the reproduction and/or the record of the information for the first optical information storing medium;

a diffractive structure is provided on the peripheral region; and a depth $\Delta d$ of the diffractive structure in a direction of the optical axis meets a following inequality:

$$\Delta d \geq k \times \lambda 1/(n1-1),$$

where n1 is a refractive index for the wavelength $\lambda 1$, and k is a natural number; and in case that the reproduction and/or the record of the information is carried out for the second optical information storing medium by using the second light source emitting the light having the wavelength of $\lambda 2$, a relation between a diffraction efficiency $E2(k)$ of a k-th order diffracted light caused by the diffractive structure and a diffraction efficiency $E2(k-1)$ of a $(k-1)$th order diffracted light meets a following inequality:

$$E2(k-1) > E2(k).$$

According to the second aspect of the present invention, because a relation between a diffraction efficiency $E2(k)$ of a k-th order diffracted light caused by the diffractive structure provided on the peripheral region and a diffraction efficiency $E2(k-1)$ of a $(k-1)$th order diffracted light meets a following inequality:

$$E2(k-1) > E2(k),$$

when the reproduction/record is carried out for the second optical information storing medium, a light amount of the k-th order diffracted light can be suppressed more than that of the $(k-1)$th order diffracted light among the flare lights in which diffracted lights having various diffraction orders and passing through the peripheral region are mixed.

In the optical pickup device, because the defocus/tracking is controlled by a main/sub sensor of a light receiving section, when the flare light enters the sensor, there is some possibility that a wrong operation relating to the reproduction/record for the optical information storing media is caused. By decreasing a light amount of higher order diffracted light which enters the sensor of the light receiving section more easily than a lower order diffracted light, it is possible that a wrong operation due to the flare light is hardly caused during the reproduction/record for the second optical information storing medium.

In the above objective, k may be 3 or 4.

In the above objective lens, the diffraction efficiency $E2(k-1)$ may be not less than 0.4.

Because the diffraction efficiency $E2(k-1)$ is not less than 0.4, when the reproduction/record is carried out for the second optical information storing medium, the diffraction efficiency of the $(k-1)$th diffracted light is enhanced among the flare lights in which the diffracted lights having various diffraction orders and passing through the peripheral region are mixed. Therefore, the diffraction efficiency of the k-th diffracted light is relatively suppressed. It is possible that a wrong operation due to the flare light is hardly caused during the reproduction/record for the second optical information storing medium.

In the above objective lens, the diffraction efficiency $E2(k)$ may be not more than 0.4.

Because the diffraction efficiency $E2(k)$ is not more than 0.4, when the reproduction/record is carried out for the second optical information storing medium, the diffraction efficiency of the k-th diffracted light is suppressed among the flare lights in which the diffracted lights having various diffraction orders and passing through the peripheral region are mixed. It is possible that a wrong operation due to the flare light is hardly caused during the reproduction/record for the second optical information storing medium.

In accordance with the third aspect of the present invention, an objective lens for being provided in an optical pickup device for carrying out a reproduction and/or a record of information for a first optical information storing medium having a protect substrate having a thickness of t1 by using a first light source emitting a light having a wavelength of $\lambda 1$, and for carrying out a reproduction and/or a record of information for a second optical information storing medium having a protect substrate having a thickness of t2 which is more than t1, by using a second light source emitting a light having a wavelength of $\lambda 2$ which is more than $\lambda 1$; comprises:

an optical functional surface;

wherein the optical functional surface is divided into at least two concentric optical functional regions which are arranged around an optical axis;

a light flux passing through a central region which is one optical functional region including the optical axis, is used for the reproduction and/or the record of the information for both the first optical information storing medium and the second optical information storing medium;

a light flux passing through a peripheral region which is another optical functional region arranged outside the central region, is mainly used for the reproduction and/or the record of the information for the first optical information storing medium;

a diffractive structure is provided on the peripheral region; and a depth $\Delta d$ of the diffractive structure in a direction of the optical axis meets a following inequality:

$$3\times\lambda 1/(n1-1) \leq \Delta d < 5\times\lambda 1/(n1-1),$$

where n1 is a refractive index for the wavelength $\lambda 1$.

According to the third aspect of the present invention, in case that the refractive index for the wavelength $\lambda 1$ of the light for carrying out the reproduction and/or the record of the information for the first optical information storing medium is n1, the depth $\Delta d$ of the diffractive structure provided on the peripheral region, in a direction of the optical axis meets a following inequality:

$$3\times\lambda 1/(n1-1) \leq \Delta d < 5\times\lambda 1/(n1-1).$$

Therefore, when the reproduction and/or the record of the information is carried out for the first optical information storing medium by using the first light source emitting the light having the wavelength $\lambda 1$, the diffraction order of the diffracted light having a maximum diffraction efficiency among the diffracted lights caused by the diffractive structure is 3 or 4.

Therefore, when the reproduction and/or the record is carried out for the second optical information storing medium, a light amount of the third order or fourth order diffracted light can be suppressed more than that of the second order or the third order diffracted light among the flare lights in which diffracted light having various diffraction orders and passing through the peripheral region are mixed.

In the optical pickup device, because the defocus/tracking is controlled by a main/sub sensor of a light receiving section, when the flare light enters the sensor, there is some possibility that a wrong operation relating to the reproduction/record for the optical information storing media is caused. By decreasing a light amount of higher order diffracted light which enters the sensor of the light receiving section more easily than a lower order diffracted light, it is possible that a wrong operation due to the flare light is hardly caused during the reproduction/record for the second optical information storing medium.

In case that the reproduction and/or the record of the information is carried out for the first optical information storing medium by using the first light source having a wavelength of $\lambda 1$, a diffraction efficiency E1(k) of a k-th order diffracted light having a maximum diffraction efficiency among a plurality of diffracted lights caused by the diffractive structure, may be not less than 0.9.

In the above objective lens, in case that the reproduction and/or the record of the information is carried out for the second optical information storing medium by using the second light source having a wavelength of $\lambda 2$, the k-th order diffracted light caused by the diffractive structure at a position may cross the optical axis nearer to a focal point as compared with the (k−1)th order diffracted light caused by the diffractive structure at the position; the position being at an identical height from the optical axis.

In case that the reproduction and/or the record is carried out for the second optical information storing medium by using the second light source emitting the light having the wavelength $\lambda 2$, because the k-th order diffracted light caused by the diffractive structure at the position which is at an identical height from the optical axis crosses the optical axis nearer to a focal point as compared with the (k−1)th order diffracted light caused by the diffractive structure at the position, the k-th order diffracted light easily enters the sensor.

Therefore, by decreasing the diffraction efficiency of the k-th order diffracted light and increasing the diffraction efficiency of the (k−1)th order diffracted light, it is possible that a wrong operation due to the flare light is hardly caused during the reproduction/record for the second optical information storing medium.

In the above objective lens, a magnification for carrying out the reproduction and/or the record of the information for the first optical information storing medium by using the first light source having the wavelength of $\lambda 1$ may be larger than a magnification for carrying out the reproduction and/or the record of the information for the second optical information storing medium by using the second light source having the wavelength of $\lambda 2$.

In the specification, the term "magnification" means a lateral magnification. When an image is inverted, the magnification has a negative value.

In the above objective lens, $\lambda 1$ may meet an inequality 640 nm$\leq \lambda 1 \leq$670 nm.

In the above objective lens, $\lambda 2$ may meet an inequality 760 nm$\leq \lambda 2 \leq$790 nm.

In the above objective lens, t2 may meet an equation t2=2×t1.

In the above objective lens, when the reproduction and/or the record of the information is carried out for the first optical information storing medium by using the first light source having the wavelength of $\lambda 1$, a numerical aperture NA1 on a side of the optical information storing medium may meet an inequality 0.60$\leq$NA1$\leq$0.65.

When the reproduction and/or the record of the information is carried out forth second optical information storing medium by using the second light source having the wavelength of 2, where n2 is the refractive index for λ2, a numerical aperture NA2 on a side of the optical information storing medium may meet an inequality $0.45 \leq NA2 \leq 0.55$.

In the objective lens, an inequality $0.82 \leq (\lambda1 \times (n2-1))/(\lambda2 \times (n1-1)) \leq 0.85$, may be satisfied.

The objective lens may be made of plastic. The objective lens can be produced cheaply.

In accordance with the fourth aspect of the present invention, an optical pickup device comprises:

a condensing optical system having the above objective lens;

the first light source for emitting the light having the wavelength of λ1;

the second light source for emitting the light having the wavelength of λ2; and a photo-detector for receiving a reflected light when a light flux emitted from one of the first light source and the second light source is reflected by an optical information storing medium;

wherein information is recorded or reproduced by condensing the light flux emitted from one of the first light source and the second light source on an information recording layer through a protect substrate of the optical information storing medium by using the condensing optical system; and at least one of a record of information on at least two types of optical information storing media and a reproduction of information from the optical information storing media is carried out, each optical information storing medium having the protect substrate having a different thickness from the others and each optical information storing medium having a different recording density from the others.

In accordance with the fifth aspect of the present invention, a recorder comprises the above-described optical pickup device and records at least one of a sound and an image.

In accordance with the sixth aspect of the present invention, a reproducer comprises the above-described optical pickup device and reproduces at least one of a sound and an image.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Figure 1:
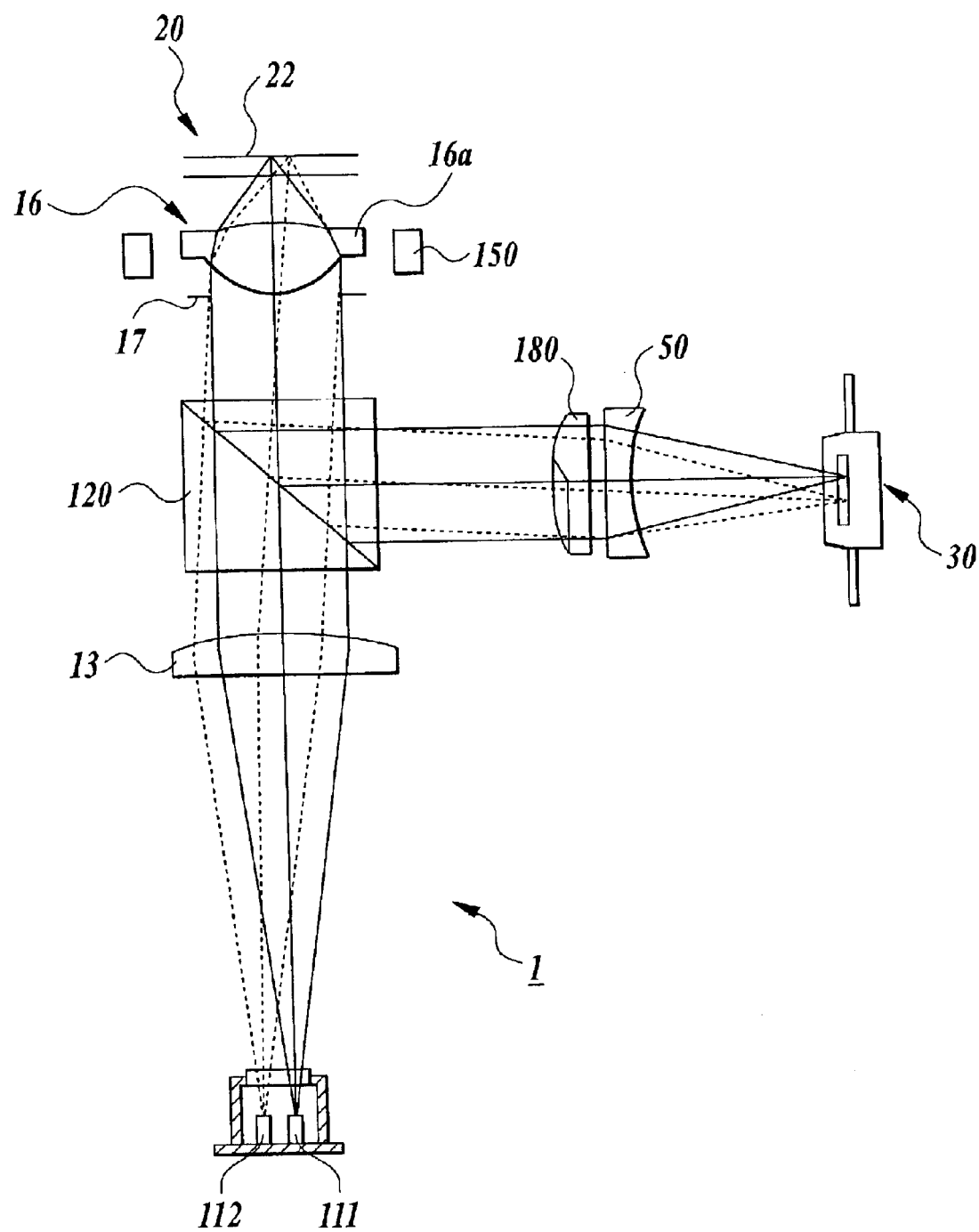
FIG. 1 is a schematic view showing the structure of the optical pickup device having the objective lens according to the present invention.

Hereinafter, an embodiment of the objective lens according to the present invention will be explained with reference to the drawings. FIG. 1 is a view showing a schematic structure of the optical pickup device comprising the objective lens according to the embodiment.

In the optical pickup device 1, information can be read out from a recording layer of a DVD (first optical information storing medium) which is an optical information storing medium, by using a light having a wavelength of λ1 (=655 nm) and emitted from a first semiconductor laser (light source). Further, in the optical pickup device 1, information can be read out from a recording layer of a CD (second optical information storing medium) by using a light having a wavelength of λ2 (=785 nm) and emitted from a second semiconductor laser (light source).

As shown in FIG. 1, in the optical pickup device 1, a first semiconductor laser 111 for emitting a light having a wavelength of λ1, and a second semiconductor laser 112 for emitting a light having a wavelength of λ2, are united. A beam splitter 120 is disposed between a collimator 13 and an objective lens 16. A light which is approximately collimated by the collimator 13, passes through the beam splitter 120 and is directed to the objective lens 16. A light flux reflected by an information recording layer 22 of the optical information storing medium (DVD or CD) 20 having a protect substrate 21, is directed to a photo-detector 30 by the beam splitter 120 which is used as an optical path changing member.

The objective lens 16 comprises a flange portion 16a on a periphery thereof. The objective lens 16 can be easily attached to the optical pickup device 1 by the flange portion 16a. Because the flange portion 16a has a surface extending to a direction perpendicular to the optical axis of the objective lens 16, it is possible to easily attach it more precisely.

When information is recorded on the DVD or is reproduced from the DVD, as shown by solid lines in FIG. 1, a light flux emitted from the first semiconductor laser 111 is transmitted through the collimator 13 and becomes a parallel light flux. The parallel light flux passes through the beam splitter 120 and is focused by the stop 17. Further, the light flux is condensed on the information recording layer 22 by the objective lens 16 through the protect substrate 21 of the DVD 20. Then, the light flux is modulated by the information pit on the information recording layer 22 and is reflected. The reflected light flux passes through the objective lens 16 and the stop 17 and is reflected by the beam splitter 120. By the cylindrical lens 180, astigmatism is given to the light flux. Further, the light flux enters the photo-detector 30 through the concave lens 50. By using a signal outputted from the photo-detector 30, the reading signal of the information recorded on the DVD 20 can be obtained.

The change in the light amount, which is caused by the shape change and the position change of the spot on the photo-detector 30, is detected to carry out the focus detection and the track detection. In accordance with the result of the detections, the two-axis actuator 150 moves the objective lens 16 so as to form an image on the information recording layer 22 of the DVD 20 by condensing the light flux emitted from the first semiconductor laser 111. Further, the two-axis actuator 150 moves the objective lens 16 so as to form an image on a predetermined track by condensing the light flux emitted from the first semiconductor laser 111.

When information is recorded on the CD or is reproduced from the CD, as shown by broken lines in FIG. 1, a light flux emitted from the second semiconductor laser 112 is transmitted through the collimator 13 and becomes a parallel light flux. The parallel light flux passes through the beam splitter 120 and is focused by the stop 17. Further, the light flux is condensed on the information recording layer 22 by the objective lens 16 through the protect substrate 21 of the CD 20. Then, the light flux is modulated by the information pit on the information recording layer 22 and is reflected. The reflected light flux passes through the objective lens 16 and the stop 17 and is reflected by the beam splitter 120. By the cylindrical lens 180, astigmatism is given to the light flux. Further, the light flux enters the photo-detector 30 through the concave lens 50. By using a signal outputted from the photo-detector 30, the reading signal of the information recorded on the CD 20 can be obtained.

The change in the light amount, which is caused by the shape change and the position change of the spot on the photo-detector 30, is detected to carry out the focus detection and the track detection. In accordance with the result of the detections, the two-axis actuator 150 moves the objective lens 16 so as to form an image on the information recording layer 22 of the CD 20 by condensing the light flux emitted from the second semiconductor laser 112. Further, the two-axis actuator 150 moves the objective lens 16 so as to form an image on a predetermined track by condensing the light flux emitted from the second semiconductor laser 112.

The objective lens 16 is a single lens having aspherical surfaces on both surfaces. One optical functional surface is divided into two concentric optical functional regions (first region (central region), second region (peripheral region) which are arranged around the optical axis, in case that the point that the numerical aperture is NA2 is regarded as a boundary between the regions.

In the second region, a diffractive structure having concentric ring-shaped zones is formed.

The refractive surface of the objective lens is formed in an aspherical surface form which is expressed by the following Equation (1).

$$Z = \frac{h^2/r}{1+\sqrt{1-(1+\kappa)(h/r)^2}} + \sum_{i=0}^{\infty} A_{2i} h^{2i} \qquad (1)$$

where Z is an axis in a direction of the optical axis (traveling direction of light is positive), h is an axis of a direction perpendicular to the optical axis (height from the optical axis), r is a paraxial curvature radius, κ is the constant of the cone and A is the aspherical coefficient.

Further, in general, the pitch of the diffraction ring-shaped zones is defined by using an phase difference function or an optical path difference function. In the concrete, the phase difference function $\phi_b$ is expressed by the following equation (2) when the unit thereof is radian. The optical path difference function $\phi_B$ is expressed by the following equation (3) when the unit thereof is mm.

$$\phi_b = \sum_{i=1}^{\infty} b_{2i} h^{2i} \qquad (2)$$

$$\phi_B = \sum_{i=1}^{\infty} B_{2i} h^{2i} \qquad (3)$$

In these two ways of the expressions for the pitch of the diffraction ring-shaped zones, although the units are different from each other, the equations are the same in respect of the expression for the pitch of the diffraction ring-shaped zones. That is, when the blazed wavelength is λ (mm), the coefficient B of the optical path difference function is obtained by multiplying the coefficient b of the phase difference function into λ/2π. On the other hand, the coefficient b of the phase difference function is obtained by multiplying the coefficient B of the optical path difference function into 2π/λ.

The objective lens 16 has a focal length f of 3.36 mm when the light flux having the wavelength λ1 (=655 nm) enters, and has a focal length of 3.38 mm when the light flux having the wavelength λ2 (=785 nm) enters. One focal length is approximately equal to the other. In case of the wavelength λ1 (=655 nm), the numerical aperture NA1 (=0.600) and the thickness t1 (=0.6 mm) of the protect substrate of the DVD, the objective lens has a sufficient image forming performance. Further, in case of the wavelength λ2 (=785 nm), the numerical aperture NA2 (=0.470) and the thickness t2 (=1.2 mm) of the protect substrate of the CD, the objective lens has a sufficient image forming performance.

In Table 1, the lens data of the objective lens 16 of the embodiment is shown. In the following tables, for example, the expression "−1.3952E−03" indicates "−1.3952×10⁻³".

TABLE 1

| | Example | |
|---|---|---|
| | DVD | CD |
| Wavelength λ (nm) | 655 | 785 |
| Focal length f (mm) | 3.36 | 3.38 |
| Image-side predetermined numerical aperture NA | 0.600 | 0.470 |

| i | ri | d1i | d2i | Material |
|---|---|---|---|---|
| 0 | ∞ | ∞ | ∞ | |
| 1 | | 2.200 | 2.200 | olefin resin |
| 2 | −7.8543 | 1.763 | 1.399 | |
| 3 | ∞ | 0.600 | 1.200 | PC |
| 4 | ∞ | | | |

Index "1" denotes λ = 655 nm,
Index "2" denotes λ = 785 nm.

| First surface (boundary hb = 1.589) | |
|---|---|
| First region (0 ≤ h < hb) | |
| R | 2.1323E+00 |
| Coefficient of optical path difference function (blazed wavelength = 655 nm) | |
| $B_4$ | −1.3952E−03 |
| $B_6$ | 2.4304E−04 |
| $B_8$ | −1.4465E−04 |
| $B_{10}$ | 2.1952E−05 |

-continued

Aspherical coefficient

| | |
|---|---|
| κ | −2.2554E+00 |
| $A_4$ | 2.0526E−02 |
| $A_6$ | −1.7912E−03 |
| $A_8$ | 3.4811E−05 |
| $A_{10}$ | 6.9554E−06 |

Second region (h ≧ hb)

| | |
|---|---|
| R | 2.0461E+00 |

Coefficient of optical path difference function (blazed wavelength = 655 nm)

| | |
|---|---|
| $B_2$ | 9.0562E−03 |
| $B_4$ | −1.4106E−02 |
| $B_6$ | 6.2345E−03 |
| $B_8$ | −1.2605−03 |
| $B_{10}$ | 9.5355E−05 |

Aspherical coefficient

| | |
|---|---|
| κ | −9.4571E−01 |
| $A_0$ | −9.2000E−05 |
| $A_4$ | −7.1766E−03 |
| $A_6$ | 2.2885E−03 |
| $A_8$ | 7.6630E−04 |
| $A_{10}$ | −2.9419E−04 |
| $A_{12}$ | 1.7308E−05 |
| $A_{14}$ | 1.1369E−06 |

Second surface

Aspherical coefficient

| | |
|---|---|
| κ | 1.0562E+01 |
| $A_4$ | 2.1590E−02 |
| $A_6$ | −1.0334E−02 |
| $A_8$ | 5.2467E−03 |
| $A_{10}$ | −1.7878E−03 |
| $A_{12}$ | 3.2508E−04 |
| $A_{14}$ | −2.2792E−05 |

Olefin resin is used as a material of the objective lens 16. Polycarbonate resin (PC) is used as a material of the protect substrate for DVD and CD. Each refractive index of these materials is shown in Table 2 in case of each reference wavelength.

TABLE 2

| | Refractive index | |
|---|---|---|
| | Wavelength | |
| | 655 nm | 785 nm |
| Olefin resin | 1.54094 | 1.53716 |
| PC | 1.57752 | 1.57063 |

Figure 2:
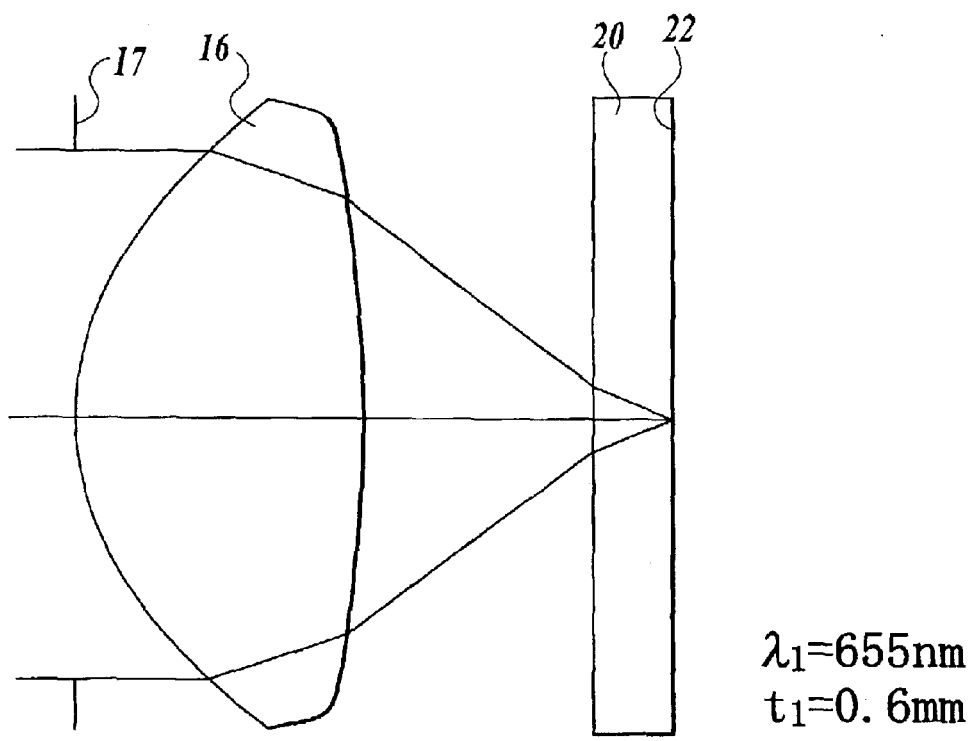
FIG. 2 is an optical path diagram in case that a light ray having a wavelength λ1 enters the objective lens which is an example of the present invention.
Figure 3:
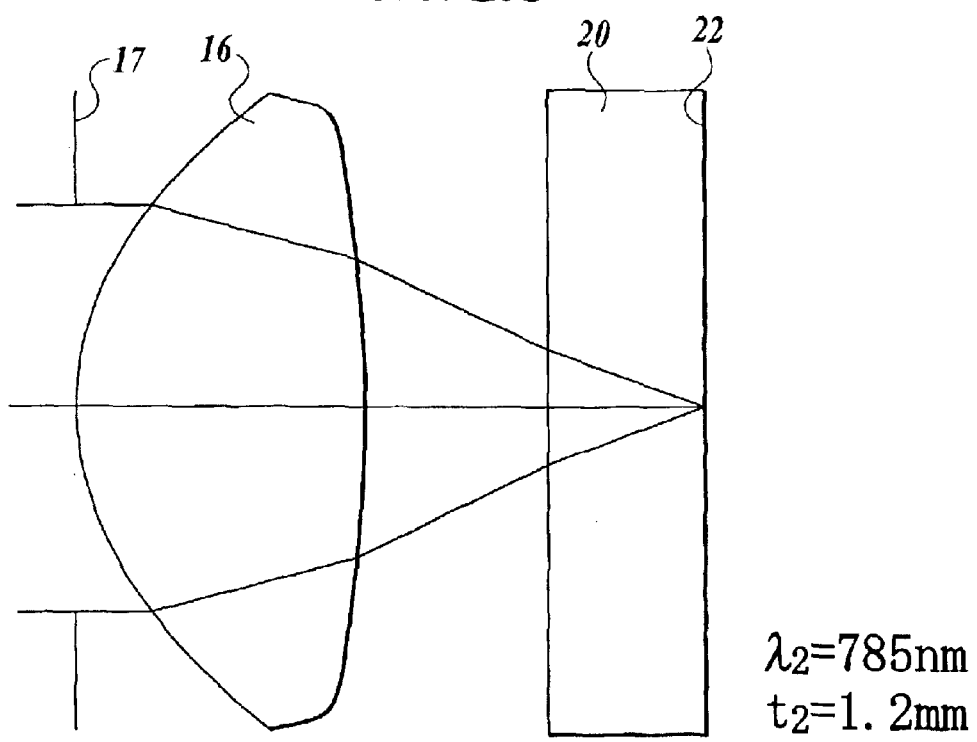
FIG. 3 is an optical path diagram in case that a light ray having a wavelength λ2 enters the objective lens which is an example of the present invention.

FIG. 2 is an optical path diagram in case that a light ray having a wavelength λ1 (=655 nm) enters the objective lens 16 and the light ray is condensed on the information recording layer 22 of the DVD which has a protect substrate having the thickness t1 (=0.6 mm). FIG. 3 is an optical path diagram in case that a light ray having a wavelength λ2 (=785 nm) enters the objective lens 16 and the light ray is condensed on the information recording layer 22 of the CD which has a protect substrate having the thickness t2 (=1.2 mm).

Further, Table 3 shows the diffraction efficiency of the second region (peripheral region) of the objective lens.

TABLE 3

Diffraction efficiency of the peripheral region (h ≧ hb)
In case of the optimization of the diffraction efficiency
for the third order diffracted light for DVD

| Diffraction | Wavelength | |
|---|---|---|
| order | 655 nm | 785 nm |
| 2 | 0 | 0.429 |
| 3 | 1 | 0.382 |

TABLE 4

Diffraction efficiency of the peripheral region (h ≧ hb)
In case of the optimization of the diffraction efficiency
for the fourth order diffracted light for DVD

| Diffraction | Wavelength | |
|---|---|---|
| order | 655 nm | 785 nm |
| 3 | 0 | 0.715 |
| 4 | 1 | 0.150 |

EXAMPLE 1

Figure 4:
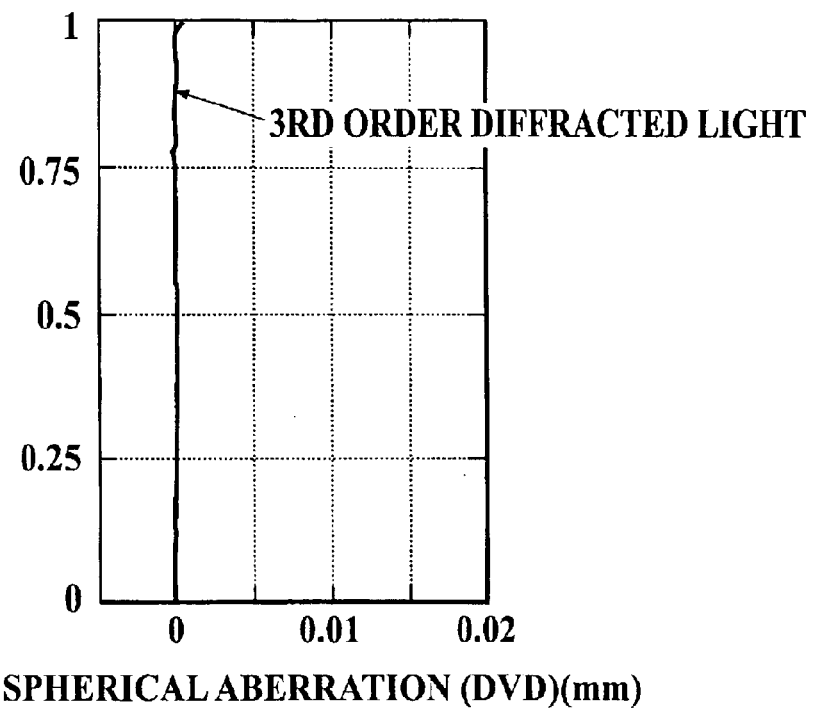
FIG. 4 is a longitudinal spherical aberration diagram of the objective lens which is an example of the present invention in case of a light ray having a wavelength λ1.
Figure 5:
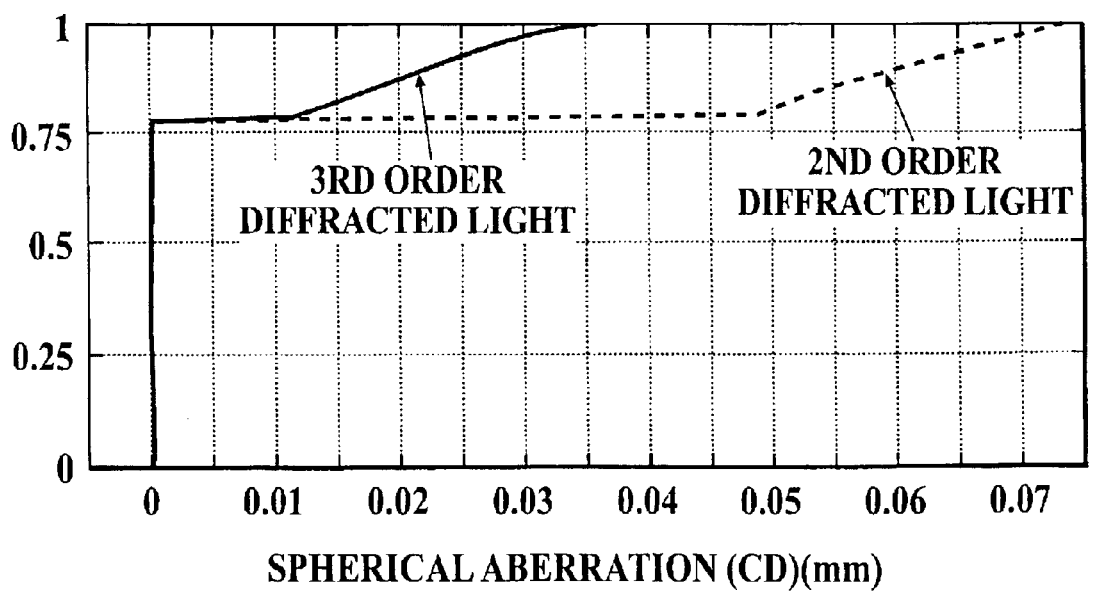
FIG. 5 is a longitudinal spherical aberration diagram of the objective lens which is an example of the present invention in case of a light ray having a wavelength λ2.

Table 3 shows the diffraction efficiency for the second order diffracted light and the diffraction efficiency for the third order diffracted light in case of the optimization of the diffraction efficiency for the third order diffracted light for DVD in the peripheral region. FIG. 4 shows a longitudinal spherical aberration diagram for DVD. FIG. 5 shows a longitudinal spherical aberration diagram for CD.

In this case, the depth Δd of the diffractive structure provided in the peripheral region of the objective lens 16 in the direction of the optical axis of the diffractive structure is expressed in the following formula:

$$\Delta d \geq 3 \times \lambda 1/(1.54094-1).$$

As shown in FIG. 5, when the light flux having the wavelength λ2=785 nm enters the objective lens 16, among the light flux passing through the second region (the region that the numerical aperture is over NA2=0.470.), the second order diffracted light crosses the optical axis more apart from the focal point as compared with the case of the third order diffracted light. From Table 3, it is found that the second order diffracted light has a larger diffraction efficiency than the third order diffracted light.

EXAMPLE 2

Figure 6:
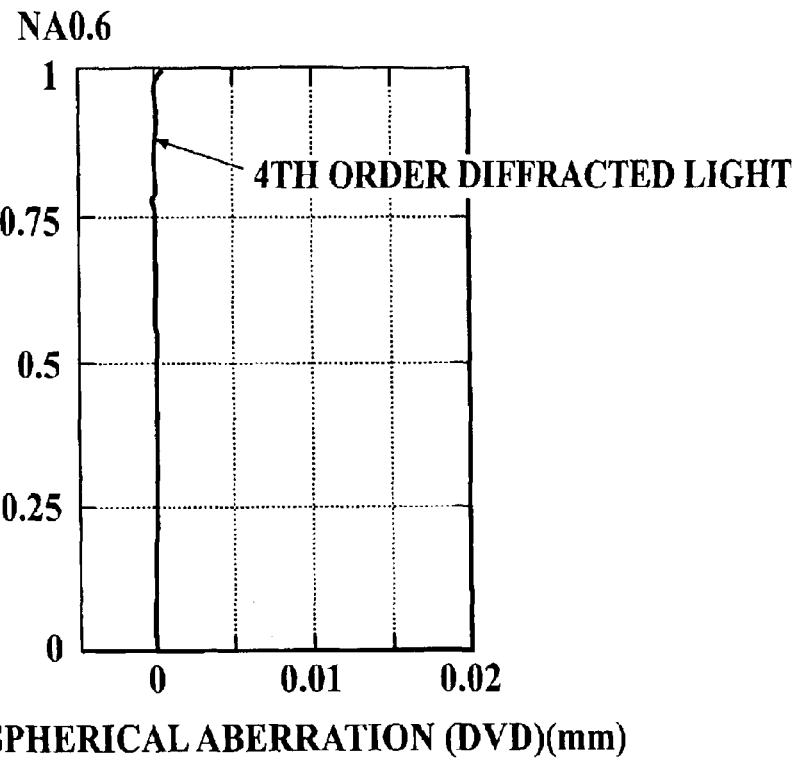
FIG. 6 is a longitudinal spherical aberration diagram of the objective lens which is another example of the present invention in case of a light ray having a wavelength λ1.
Figure 7:
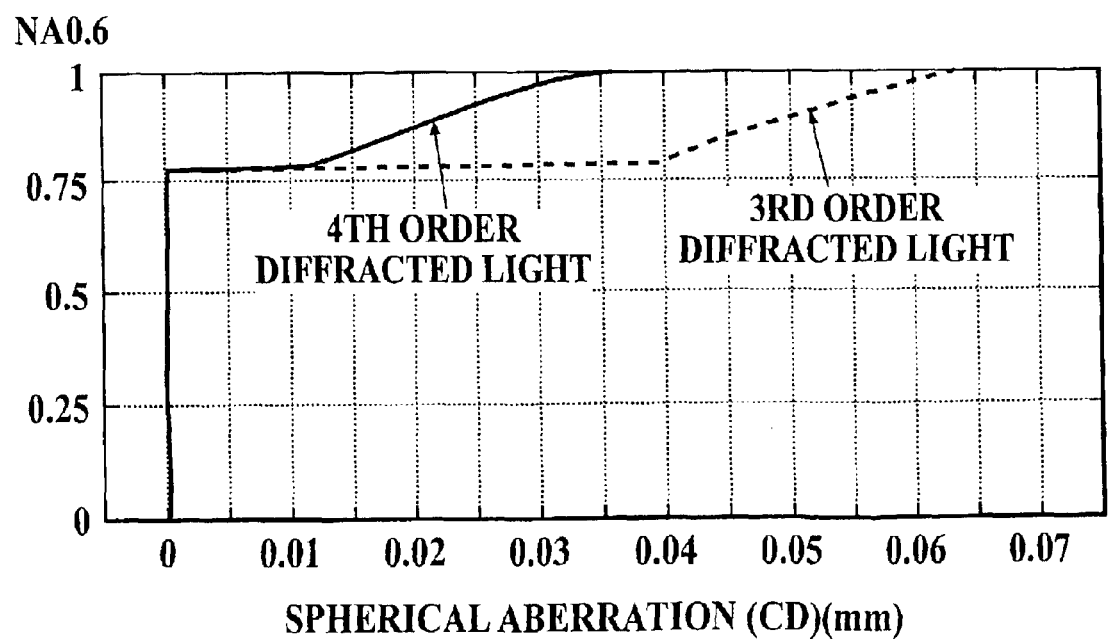
FIG. 7 is a longitudinal spherical aberration diagram of the objective lens which is another example of the present invention in case of a light ray having a wavelength λ2.

Table 4 shows the diffraction efficiency for the third order diffracted light and the diffraction efficiency for the fourth order diffracted light in case of the optimization of the diffraction efficiency for the fourth order diffracted light for DVD in the peripheral region. FIG. 6 shows a longitudinal spherical aberration diagram for DVD. FIG. 7 shows a longitudinal spherical aberration diagram for CD.

In this case, the depth Δd of the diffractive structure provided in the peripheral region of the objective lens 16 in the direction of the optical axis of the diffractive structure is expressed in the following formula:

$$\Delta d \geq 4 \times \lambda 1/(1.54094-1).$$

As shown in FIG. 7, when the light flux having the wavelength λ2=785 nm enters the objective lens 16, among the light flux passing through the second region, the third order diffracted light crosses the optical axis more apart from the focal point as compared with the case of the fourth order diffracted light. From Table 4, it is found that the third order diffracted light has a much larger diffraction efficiency than the fourth order diffracted light.

As described above, in the optical pickup device 1, during the reproduction/record for the CD, the diffraction efficiency of the flare light which reaches a position near the focal point is small. Further, the diffraction efficiency of the flare light which reaches a position apart from the focal point is large.

As a result, a light amount of the flare light entering the photo-detector 30 of the optical pickup device 1 is small. The accuracy of the focus detection on the photo-detector 30 and that of the track detection are increased. It is possible to prevent a wrong operation of the tracking control.

In the above-described embodiment, the first optical information storing medium is a DVD (light source wavelength: about 650 nm). The second optical information storing medium is a CD (light source wavelength: about 780 nm). However, the present invention is not limited to this.

For example, the first optical information storing medium may be a next generation high density optical disk (light source wavelength: about 400 nm). The second optical information storing medium may be a DVD (light source wavelength: about 650 nm).

The optical pickup device shown in FIG. 1, can be provided in a recorder and a reproducer for at least one of a sound and an image, for example, a player or a drive which is compatible with an optical information recording medium, such as CD, CD-R, CD-RW, CD-Video, CD-ROM, DVD, DVD-ROM, DVD-RAM, DVD-R, DVD-RW, DVD+RW, MD or the like, or an AV apparatus, a personal computer or other information terminals into which the player or the drive is incorporated, or the like.

The other detail constructions may be modified.

According to the present invention, when the reproduction/record is carried out for the first optical information storing medium, the k-th order diffracted light having the maximum diffraction efficiency can be condensed on a focal point. Further, when the reproduction/record is carried out for the second optical information storing medium, it is possible to suppress a light amount of the k-th order diffracted light more than the (k+1)th order diffracted light which causes a larger aberration than the k-th order diffracted light, among the flare lights in which the diffracted lights passing through the peripheral region and having various diffraction orders are mixed.

In the optical pickup device, because the defocus/tracking is controlled by the main/sub sensor of the light receiving section, there is some possibility that a wrong operation relating to the reproduction/record for the optical information storing media is caused when the flare light enters the sensor. However, by decreasing a light amount of higher order diffracted light which enters the sensor of the light receiving section more easily than a lower order diffracted light, it is possible that a wrong operation due to the flare light is hardly caused during the reproduction/record for the second optical information storing medium.

The entire disclosure of Japanese Patent Application No. Tokugan 2002-172288 filed on Jun. 13, 2002 including specification, claims drawings and summary are incorporated herein by reference in its entirety.

What is claimed is:

1. An objective lens for being provided in an optical pickup device for carrying out a reproduction and/or a record of information for a first optical information storing medium having a protect substrate having a thickness of t1 by using a first light source emitting a light having a wavelength of $\lambda 1$, and for carrying out a reproduction and/or a record of information for a second optical information storing medium having a protect substrate having a thickness of t2 which is more than t1, by using a second light source emitting a light having a wavelength of $\lambda 2$ which is more than $\lambda 1$; the objective lens comprising:

an optical functional surface;

wherein the optical functional surface is divided into at least two concentric optical functional regions which are arranged around an optical axis;

a light flux passing through a central region which is one optical functional region including the optical axis, is used for the reproduction and/or the record of the information for both the first optical information storing medium and the second optical information storing medium;

a light flux passing through a peripheral region which is another optical functional region arranged outside the central region, is mainly used for the reproduction and/or the record of the information for the first optical information storing medium;

a diffractive structure is provided on the peripheral region;

in case that the reproduction and/or the record of the information is carried out for the first optical information storing medium by using the first light source emitting the light having the wavelength of $\lambda 1$, a diffraction order of a diffracted light having a maximum diffraction efficiency among a plurality of diffracted lights caused by the diffractive structure is k which is a natural number; and in case that the reproduction and/or the record of the information is carried out for the second optical information storing medium by using the second light source emitting the light having the wavelength of $\lambda 2$, a relation between a diffraction efficiency E2(k) of a k-th order diffracted light caused by the diffractive structure and a diffraction efficiency E2(k−1) of a (k−1)th order diffracted light meets a following inequality:

$$E2(k-1)>E2(k).$$

2. The objective lens of claim 1, wherein k is 3.

3. The objective lens of claim 1, wherein k is 4.

4. The objective lens of claim 1, wherein the diffraction efficiency E2(k−1) is not less than 0.4.

5. The objective lens of claim 1, wherein the diffraction efficiency E2(k) is not more than 0.4.

6. The objective lens of claim 1, wherein in case that the reproduction and/or the record of the information is carried out for the first optical information storing medium by using the first light source having a wavelength of $\lambda 1$, a diffraction efficiency E1(k) of a k-th order diffracted light having a maximum diffraction efficiency among a plurality of diffracted lights caused by the diffractive structure, is not less than 0.9.

7. The objective lens of claim 1, wherein in case that the reproduction and/or the record of the information is carried out for the second optical information storing medium by using the second light source having a wavelength of $\lambda 2$, the k-th order diffracted light caused by the diffractive structure at a position crosses the optical axis nearer to a focal point as compared with the (k−1)th order diffracted light caused by the diffractive structure at the position; the position being at an identical height from the optical axis.

8. The objective lens of claim 1, wherein a magnification for carrying out the reproduction and/or the record of the information for the first optical information storing medium by using the first light source having the wavelength of λ1 is larger than a magnification for carrying out the reproduction and/or the record of the information for the second optical information storing medium by using the second light source having the wavelength of λ2.

9. The objective lens of claim 1, wherein λ1 meets a following inequality:

640 nm≦λ1≦670 nm.

10. The objective lens of claim 1, wherein λ2 meets a following inequality:

760 nm≦λ2≦790 nm.

11. The objective lens of claim 1, wherein t2 meets a following equation:

$t2=2 \times t1$.

12. The objective lens of claim 1, wherein when the reproduction and/or the record of the information is carried out for the first optical information storing medium by using the first light source having the wavelength of λ1, a numerical aperture NA1 on a side of the optical information storing medium meets a following inequality:

0.60≦NA1≦0.65.

13. The objective lens of claim 1, wherein when the reproduction and/or the record of the information is carried out for the second optical information storing medium by using the second light source having the wavelength of λ2, a numerical aperture NA2 on a side of the optical information storing medium meets a following inequality:

0.45≦NA2≦0.55.

14. The objective lens of claim 1, wherein a following inequality:

0.82≦(λ1×(n2−1))/(λ2×(n1−1))≦0.85 where n1 is the refractive index for λ1 and n2 is the refractive index for λ2 is satisfied.

15. The objective lens of claim 1, wherein the objective lens is made of plastic.

16. An optical pickup device comprising:
a condensing optical system having the objective lens of claim 1;
the first light source for emitting the light having the wavelength of λ1;
the second light source for emitting the light having the wavelength of λ2; and
a photo-detector for receiving a reflected light when a light flux emitted from one of the first light source and the second light source is reflected by an optical information storing medium;
wherein information is recorded or reproduced by condensing the light flux emitted from one of the first light source and the second light source on an information recording layer through a protect substrate of the optical information storing medium by using the condensing optical system; and at least one of a record of information on at least two types of optical information storing media and a reproduction of information from the optical information storing media is carried out, each optical information storing medium having the protect substrate having a different thickness from the others and each optical information storing medium having a different recording density from the others.

17. A recorder for recording at least one of a sound and an image, comprising the optical pickup device of claim 16.

18. A reproducer for reproducing at least one of a sound and an image, comprising the optical pickup device of claim 16.

19. An objective lens for being provided in an optical pickup device for carrying out a reproduction and/or a record of information for a first optical information storing medium having a protect substrate having a thickness of t1 by using a first light source emitting a light having a wavelength of λ1, and for carrying out a reproduction and/or a record of information for a second optical information storing medium having a protect substrate having a thickness of t2 which is more than t1, by using a second light source emitting a light having a wavelength of λ2 which is more than λ1; the objective lens comprising:
an optical functional surface;
wherein the optical functional surface is divided into at least two concentric optical functional regions which are arranged around an optical axis;
a light flux passing through a central region which is one optical functional region including the optical axis, is used for the reproduction and/or the record of the information for both the first optical information storing medium and the second optical information storing medium;
a light flux passing through a peripheral region which is another optical functional region arranged outside the central region, is mainly used for the reproduction and/or the record of the information for the first optical information storing medium;
a diffractive structure is provided on the peripheral region; and
a depth Δd of the diffractive structure in a direction of the optical axis meets a following inequality:

3×λ1/(n1−1)≦Δd<5×λ1/(n1−1), where n1 is a refractive index for the wavelength λ1.

20. The objective lens of claim 19, wherein λ1 meets a following inequality:

640 nm≦λ1≦670 nm.

21. An optical pickup device comprising:
a condensing optical system having the objective lens of claim 19;
the first light source for emitting the light having the wavelength of λ1;
the second light source for emitting the light having the wavelength of λ2; and
a photo-detector for receiving a reflected light when a light flux emitted from one of the first light source and the second light source is reflected by an optical information storing medium;
wherein information is recorded or reproduced by condensing the light flux emitted from one of the first light source and the second light source on an information recording layer through a protect substrate of the optical information storing medium by using the condensing optical system; and at least one of a record of information on at least two types of optical information storing media and a reproduction of information from the optical information storing media is carried out, each optical information storing medium having the protect substrate having a different thickness from the others and each optical information storing medium having a different recording density from the others.

22. A recorder for recording at least one of a sound and an image, comprising the optical pickup device of claim 21.

23. A reproducer for reproducing at least one of a sound and an image, comprising the optical pickup device of claim 21.

* * * * *